Patented Nov. 3, 1925.

1,559,960

UNITED STATES PATENT OFFICE.

EUGENE M. HECKMAN, OF AVALON, PENNSYLVANIA.

CLEANING COMPOUND.

No Drawing.  Application filed June 21, 1924. Serial No. 721,586.

*To all whom it may concern:*

Be it known that I, EUGENE M. HECKMAN, a citizen of the United States, and resident of Avalon, in the county of Allegheny and State of Pennsylvania, have invented a new and useful Improvement in Cleaning Compounds; and I do hereby declare the following to be a full, clear, and exact description thereof.

My invention relates to cleaning and scouring compounds, and particularly to a compound containing scouring and chemical cleansing agents.

My invention has for its object the provision of a cleaning compound that is particularly suitable for use in cases where both a solvent and an abrasive are desired.

Heretofore soap powders have been employed in connection with an abrasive, such as volcanic ash and silex, but the abrasives tend to scratch the surfaces being cleansed, unless formed of exceedingly fine granules. For instance, in some cases it is necessary to use an abrasive of such fineness that its granules will pass through a 1/100th inch mesh.

I have discovered that blast furnace slag may be advantageously used as an abrasive agent even in granules as coarse as 12 mesh, without danger of marring the object to be cleansed, although in some cases I shall prefer to employ granules of 100 mesh size, or smaller, to meet certain conditions and requirements.

Blast furnace slag is commonly understood to be silicates of lime and alumina. The slag may be granulated in various ways the most common of which is by introducing it while hot or molten, into water. The slag particles resulting from tne breaking down of the granules still retain their abrasive characteristic.

My invention is particularly suitable for cleaning the exteriors of buildings having walls of terra cotta or other materials. A soap powder, soap paste, soft soap, jelly soap or other chemical agent or combinations of same is preferably added to prepared slag. I have found that mixing the granulated slag and soap in about equal proportions, gives very satisfactory results, although these proportions may be varied to suit different conditions. The soap may be either in the form of a powder, paste, or even what is commonly known as soft soap or soap jelly.

The composition is employed simply by washing or scrubbing the surface with the mixture plus a suitable quantity of water.

The composition has proven very useful in cleansing the walls of buildings and painted surfaces, and may also be used around garages, machine shops, etc., as a cleanser for the hands.

I claim as my invention:

1. A cleaning compound consisting of blast furnace slag, granulated by introducing it into water while hot, and soap, in substantially equal proportions.

2. A cleaning compound consisting of blast furnace slag, granulated by introducing it into water while hot, and soap.

In testimony whereof I, the said EUGENE M. HECKMAN, have hereunto set my hand.

EUGENE M. HECKMAN.